United States Patent
Min

(10) Patent No.: US 6,302,931 B1
(45) Date of Patent: Oct. 16, 2001

(54) APPARATUS FOR INJECTING COMPRESSED AIR INTO DUST COLLECTOR

(76) Inventor: Hung Ki Min, 37-21, Yangjeok-ri, Woochon-myun, Hoengson-gun, Kangwon-do (KR)

( * ) Notice: Subject to any disclaimer, the term of this patent is extended or adjusted under 35 U.S.C. 154(b) by 0 days.

(21) Appl. No.: 09/397,842

(22) Filed: Sep. 16, 1999

(30) Foreign Application Priority Data

May 3, 1999 (KR) .................................................. 99-7364

(51) Int. Cl.[7] .................................................. B01D 46/04
(52) U.S. Cl. .................................. 55/283; 55/302; 95/280
(58) Field of Search ........................... 55/283, 293, 302; 96/425, 427; 95/26, 280

(56) References Cited

U.S. PATENT DOCUMENTS

| | | | | |
|---|---|---|---|---|
| 3,073,097 | * | 1/1963 | Hallett et al. | 55/283 |
| 3,377,783 | * | 4/1968 | Young | 55/302 |
| 3,521,430 | * | 7/1970 | Vanderlip et al. | 55/283 |
| 3,540,193 | * | 11/1970 | Pausch | 55/283 |
| 3,543,481 | * | 12/1970 | Pausch | 55/283 |
| 3,570,542 | * | 3/1971 | Otto et al. | 55/283 |
| 3,729,903 | * | 5/1973 | Espeel et al. | 55/283 |
| 3,735,566 | * | 5/1973 | Laliwala | 55/302 |
| 3,757,497 | * | 9/1973 | Ray | 55/302 |
| 3,816,979 | * | 6/1974 | Wales | 55/302 |
| 3,841,065 | * | 10/1974 | Espeel | 55/302 |
| 4,033,732 | * | 7/1977 | Axelsson et al. | 55/302 |
| 4,077,781 | * | 3/1978 | Sundstrom | 55/302 |
| 4,190,230 | * | 2/1980 | Geissbuhler | 55/302 |
| 4,433,986 | * | 2/1984 | Borst | 55/302 |
| 5,533,706 | * | 7/1996 | Aurell | 55/302 |

\* cited by examiner

Primary Examiner—Duane S. Smith
(74) Attorney, Agent, or Firm—Roth & Goldman

(57) ABSTRACT

An apparatus for injecting compressed air into a dust collector in a direction opposite to the dust filtering direction to detach adhered dust includes a dust collecting tank with a plurality of filter cloths and a plurality of air injecting pipes installed therein, and an air header secured to the outside of the dust collecting tank by means of fastening members. The air injecting pipes are connected through connecting devices to the circumferential wall of a head cylinder of the air header and a plurality of pulse valves, distribution tubes and solenoid valves are installed on a control box which accommodates a printed circuit board of a control part which periodically admits the supply of the compressed air.

4 Claims, 15 Drawing Sheets

APPARATUS FOR INJECTING COMPRESSED AIR INTO DUST COLLECTOR

CROSS REFERENCE TO RELATED APPLICATIONS, IF ANY

None

FIELD OF THE INVENTION

The present invention relates to a pulse jet type filtering dust collector. Particularly, the present invention relates to an apparatus for injecting a compressed air into a dust collector, in which an air header injects compressed air, and a control box controls the operation, the air header including an extrusion-molded aluminum cylinder and a plurality of pulse valves, and the control box including a plurality of separate solenoid control valves. Thus the constitution of the apparatus is simple, its assembly is easy, and the operation is stable.

BACKGROUND OF THE INVENTION

Generally, a filtering dust collector captures dust particles from a gas by using a filtering cloth, and this dust collector is classified into various kinds in accordance with the method of removing the adhered dust particles. In a pulse jet filtering dust collector, a compressed air is periodically spouted into the inside of the filtering cloth in a direction opposite to the filtering direction, thereby detaching the adhered dust particles from the filtering cloth.

FIG. 1 is a perspective view of a part of the conventional filtering dust collector, and FIG. 2 is a sectional view of the conventional filtering dust collector. As shown in these drawings, a dust collecting tank 1 accommodates a plurality of filtering cloths 3 secured to a securing plate 2. A bag cage 4 is attached to each of the filtering cloths 3, and a venturi tube 5 is connected to the upper portion of the filtering cloth 3 within the filtering cloth 3.

Outside the dust collecting tank 1, there is installed a header cylinder 100 of an air header. This header cylinder 100 is provided with a plurality of discharge holes 101 on its top, and each of the discharge holes is connected to a ball valve 102. Each of the ball valves 102 is connected to a pulse valve 103, and each of the pulse valves 103 is connected to a connecting tube 106, while each of the connecting tubes 106 is connected to an air injecting pipe 13. Onto the wall of the dust collecting tank 1, the ends of the air injecting pipes 13 are secured by means of connectors 14. Each of the air injecting pipes 13 is provided with a plurality of nozzles 15, and each of the nozzles 15 is disposed directly above the opening of each of the filtering cloths 3. The other end of each of the air injecting pipes 13 is secured to the inside of the wall of the dust collecting tank 1 by means of a fastening member 16.

The pulse valve 103 has an inletting hole 103a in the lower portion of it and a discharge hole 103b in the front portion of it. The lower inletting hole 103a is connected to the ball valve 102, and the front discharge hole 103b is connected to the connecting tube 106, while a solenoid valve 104 is connected to a side of the pulse valve.

In this conventional filtering dust collector, the air which contains dust particles is introduced through an inlet 1a into the dust collecting tank 1, while the filtered air is discharged through an outlet 1b. In this manner, the dust particles which are contained in the air are filtered and adhered on the outside of the filtering cloth 3, with the result that the clean air is discharged through outlet 1b.

Periodically, the pulse valves 103 which are coupled to the header cylinder 100 are opened, and thus, the compressed air which is contained in the header cylinder 100 is spouted through the pulse valves 103 and through the nozzles 15 of the air injecting pipes 13 into the interior of the filtering cloths 3. Therefore, the filtering cloths 3 strongly vibrate, and the dust particles which adhere on the outside of the filtering cloths 3 are detached from the filtering cloths 3 to be collected to the bottom of the dust collecting tank 1. These collected dust particles are discharged from the bottom of the tank 1 through a rotary discharge valve 105.

In this conventional dust collector, the header cylinder is manufactured in the following manner. That is, flanges are welded to both ends of a cylindrical pipe, and compressed air supplying pipes are connected to the header cylinder. Further, the ball valves and the pulse valves are connected to the discharge holes of the header cylinder, and therefore, the constitution of the header cylinder is very complicated, while inconveniences are encountered when the plurality of the valves are assembled to the header cylinder. Further, there are other difficulties in maintaining the constant pitches and the constant straightness. In manufacturing the dust collector, the pipes have to be procured, drilled and welded, and therefore, the labor costs are increased, while the manufacturing period is extended.

Further, in the case where the pulse valves are directly connected to the header cylinder, and the solenoid valves are directly connected to the pulse valves, the pressure loss becomes seriously large during the actuation of the valves. Further, the pressure loss is voluminous at the bent portions of the pipes. Further, the inlets and the outlets of the valves are same with each other in their cross sections, and therefore, the flow amounts are small, as well as reducing the flow coefficient. Consequently, the dust detaching efficiency is aggravated.

Further, the pipes are corroded by the internal moisture of the header cylinder, and the resultant rusts are introduced into the valves to clog the bleed holes, thereby causing malfunctions in the valves.

Further, the solenoid valves and the timers are separately provided, and therefore, the assembling becomes very difficult, with the result that the manufacturing cost increases and the manufacturing period is extended.

SUMMARY OF THE INVENTION

The present invention is intended to overcome the above described disadvantages of the conventional techniques.

Therefore it is an object of the present invention to provide an apparatus for injecting a compressed air into a dust collector, in which an air header injects compressed air, and a control box controls the operation, the air header including an aluminum cylinder and a plurality of pulse valves, and the control box including a plurality of separately controlling type solenoid valves. Thus the constitution of the apparatus is simple, its assembling is easy, and the operation is stable.

In achieving the above object, the apparatus for injecting a compressed air into a dust collector in a direction opposite to the filtering direction so as to detach adhered dust particles according to the present invention includes: a dust collecting tank with a plurality of filtering cloths and a plurality of air injecting pipes installed therein; an air header secured to the outside of the dust collecting tank by means of fastening members; a plurality of air injecting pipes connected through connecting devices to a circumferential wall of a head cylinder of the air header; a plurality of pulse valves directly secured to another part of the circumferential wall of the header cylinder, for closing/opening a supply of a compressed air; a plurality of distribution tubes secured between the pulse valves and the connecting devices; a control box accommodating a printed circuit board of a control part; and a plurality of solenoid valves installed on the control box so as to be connected between the pulse valves and air hoses, for periodically actuating the pulse valves.

The header cylinder is extrusion-molded by using aluminum, and the cylindrical body of the header cylinder includes a plurality of reinforcing projections and flat parts (integrally formed together), while header covers are secured to both ends of the header cylinder.

The pulse valve includes: an inner body secured on the flat part of the header cylinder, with a round discharge part being supported by a plurality of ribs and provided at an intermediate part, and with a supply pressure chamber being provided therein; an outer body secured to the inner body, and having a discharge part and an intermediate pressure chamber, the inner and outer bodies having a pilot flow path; a first diaphragm secured between the inner and outer bodies, for opening/closing a hole of the discharge part; a spring installed at an upper intermediate portion of the first diaphragm, for elastically pressing down the first diaphragm; a valve cover secured to the outer body, having a switching pressure chamber and an outletting hole connected to an air hose; a second diaphragm secured between the outer body and the valve cover, for opening/closing the discharge part, and having a communicating hole on a side thereof; and a conical spring coupled between the valve cover and the second diaphragm, for elastically supporting the second diaphragm.

The control box includes: a main body and a cover coupled together through a hinge; a lock part for locking the cover to the main body; a plurality of solenoid valves secured therein; and a printed circuit board as a control part installed on the cover.

BRIEF DESCRIPTION OF THE DRAWINGS

The above object and other advantages of the present invention will become more apparent by describing in detail the preferred embodiment of the present invention with reference to the attached drawings in which:

(FIGS. 3 to 13 illustrate the apparatus for injecting a compressed air into the dust collector according to the present invention;)

FIG. 3 is a partly cut-away frontal view showing the critical portions of the dust collector;

FIG. 4 is a perspective view of the air header;

FIG. 5 is a plan view of the air header;

FIG. 6 is a sectional view of the air header;

FIG. 8 is a partially exploded frontal view of the solenoid valve;

FIG. 9 is an exploded perspective of the solenoid valve;

FIG. 12 is a perspective view of the header cylinder; and

FIG. 13 is a sectional view of the header cylinder.

DETAILED DESCRIPTION OF THE PREFERRED EMBODIMENT

Figure 1:
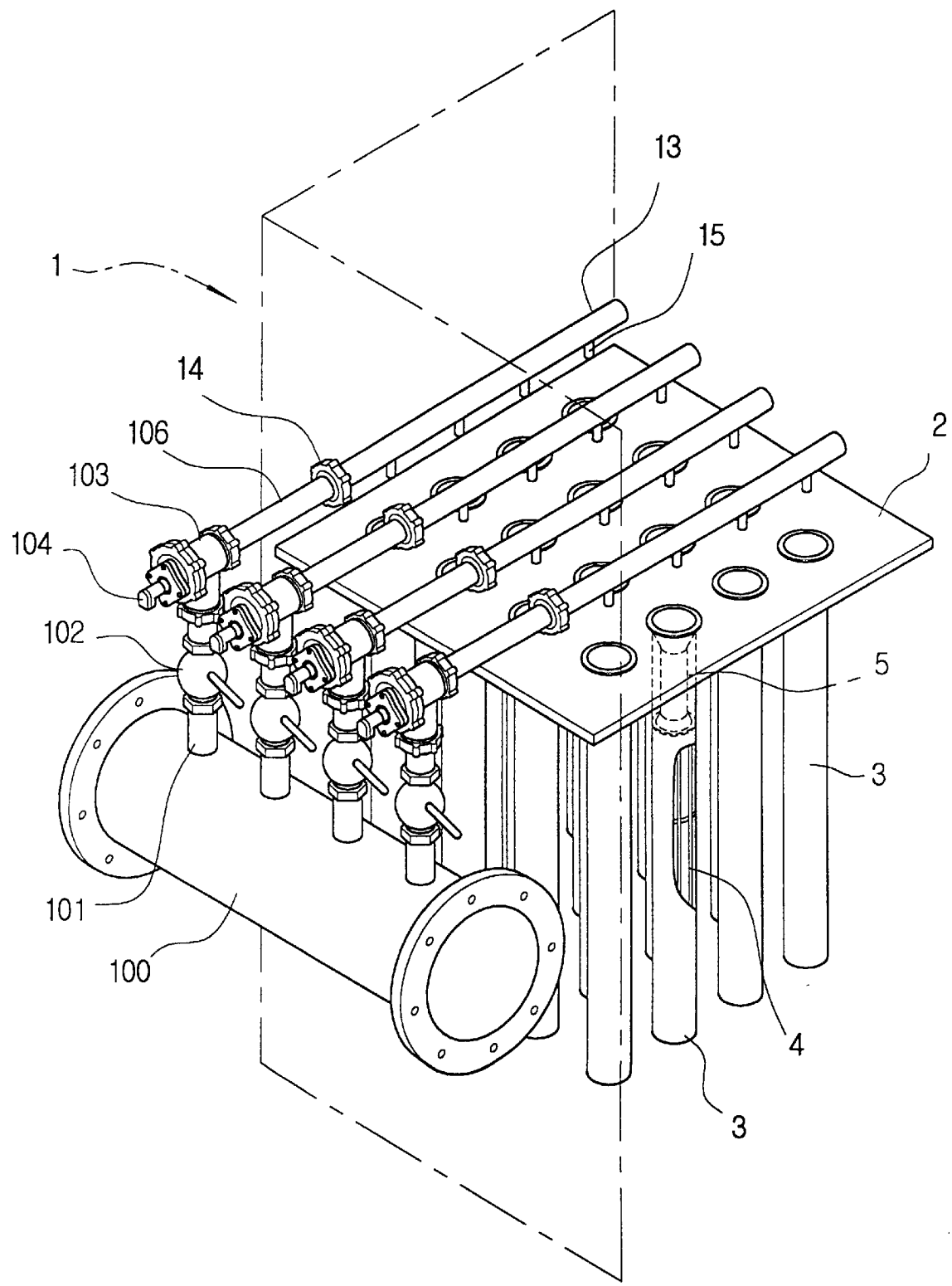
FIG. 1 is a perspective view of a part of the conventional filtering dust collector.
Figure 2:
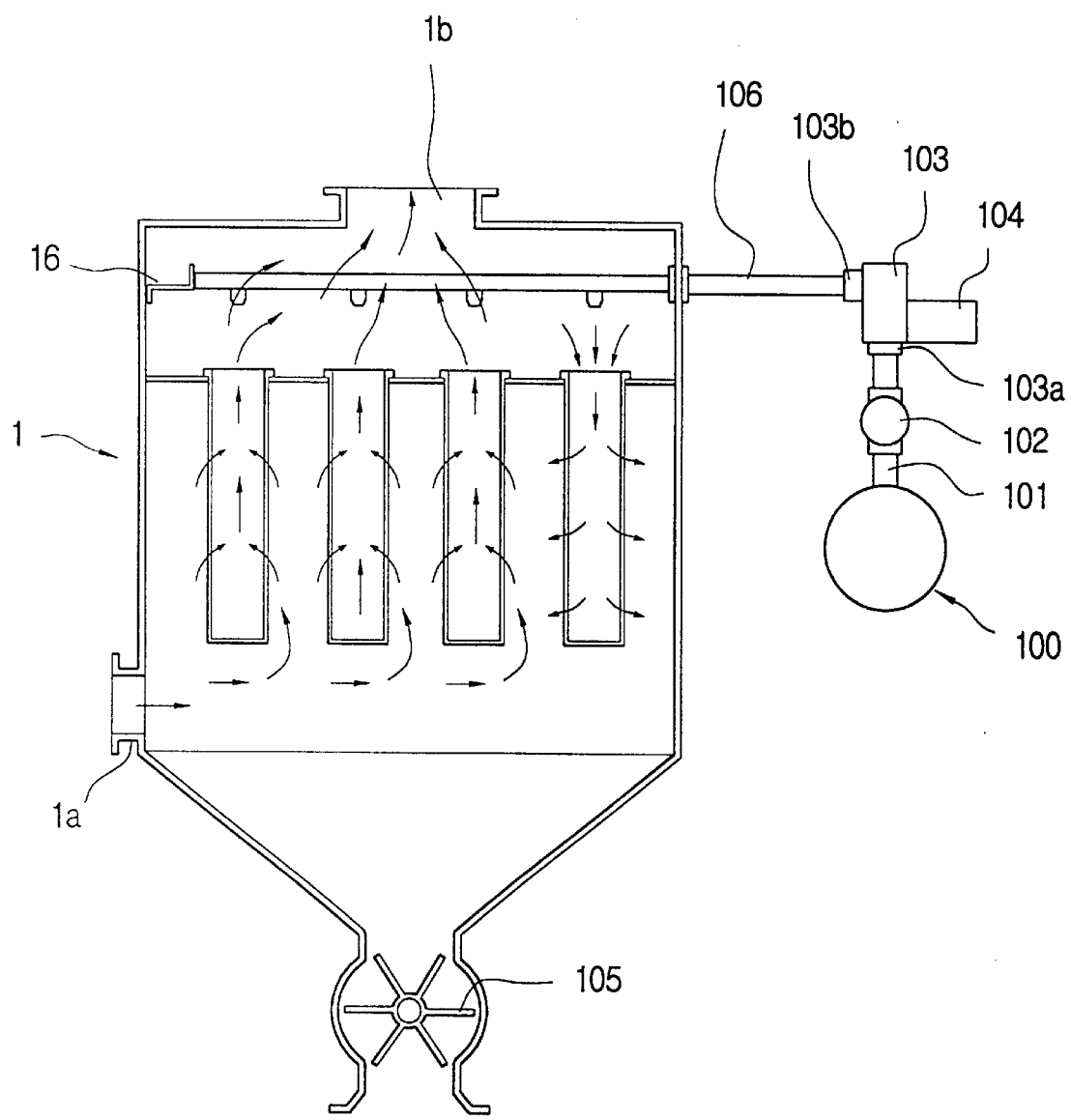
FIG. 2 is a sectional view of the conventional filtering dust collector.
Figure 3:
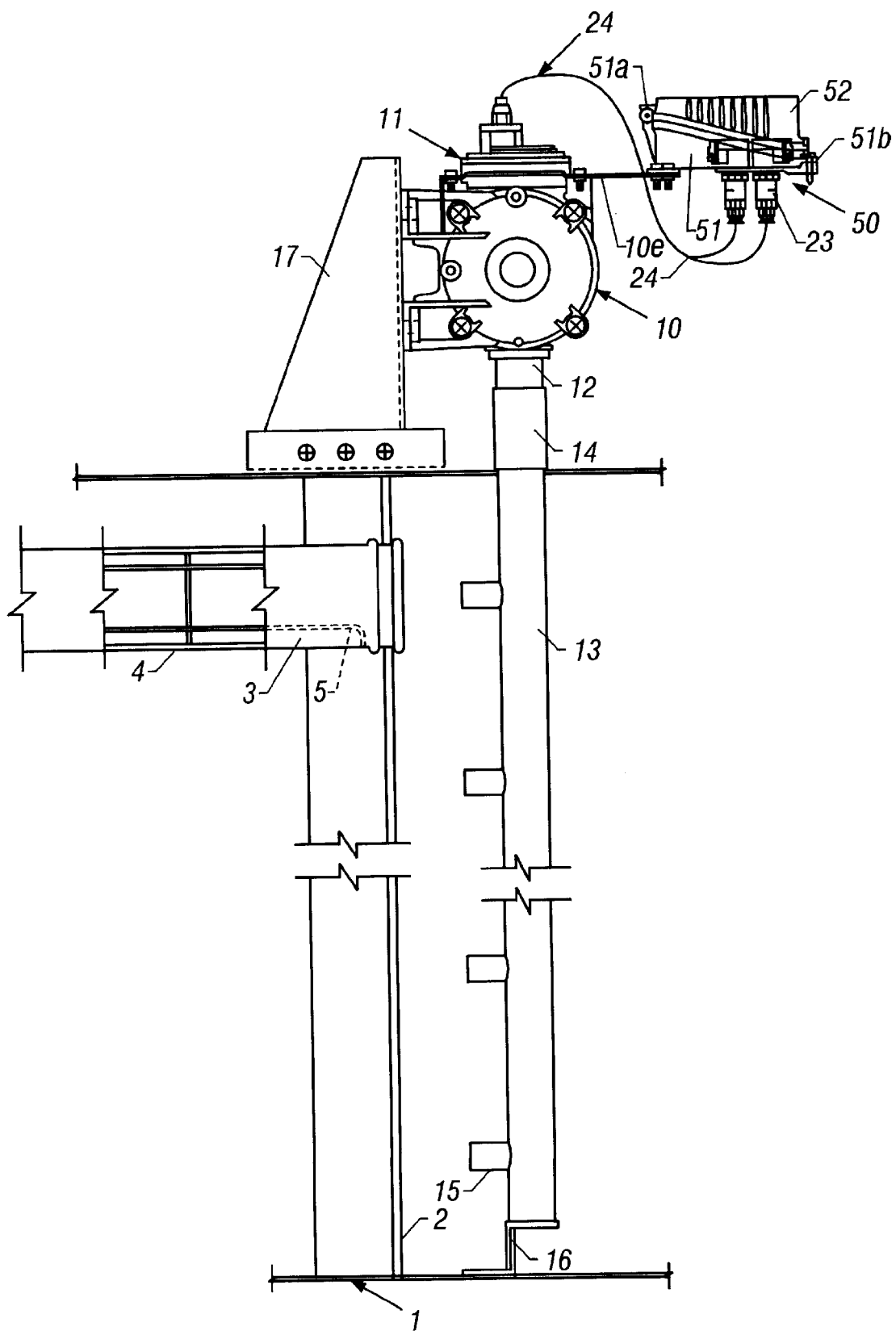

FIG. 3 is a partly cut-away frontal view showing the critical portions of the dust collector. As shown in this drawing, a plurality of filtering cloths 3 are secured in an upper portion within a dust collecting tank 1, each of the filtering cloths 3 covering a bag cage 4. Further, a venturi tube a is connected within the upper portion of the filtering cloth 3.

At a side of the dust collecting tank 1, a header cylinder 10 of an air header 9 is secured. On a side of the header cylinder 10, there are secured a plurality of pulse valves 11, while on another side of the header cylinder 10, there are connected a plurality of connecting devices 12. Each of the connecting devices 12 is connected to each of air injecting pipes 13. Actually the air injecting pipe 13 is connected to a connector 14 which is secured to the circumferential wall of the dust collecting tank 1. A plurality of nozzles 15 are formed on each of the air injecting pipes 13 at certain intervals, with the lower tip of each of the nozzles 15 being faced toward the opening of the filtering cloth 3 to spout a compressed air into the cloth 3. The other end of the air injecting pipe 13 is secured to the insides of the wall of the dust collecting tank 1 by a bracket 16.

The header cylinder 10 of the air header 9 is secured at a side of the wall of the dust collecting tank 1 by means of a fastening member 17.

Figure 4:
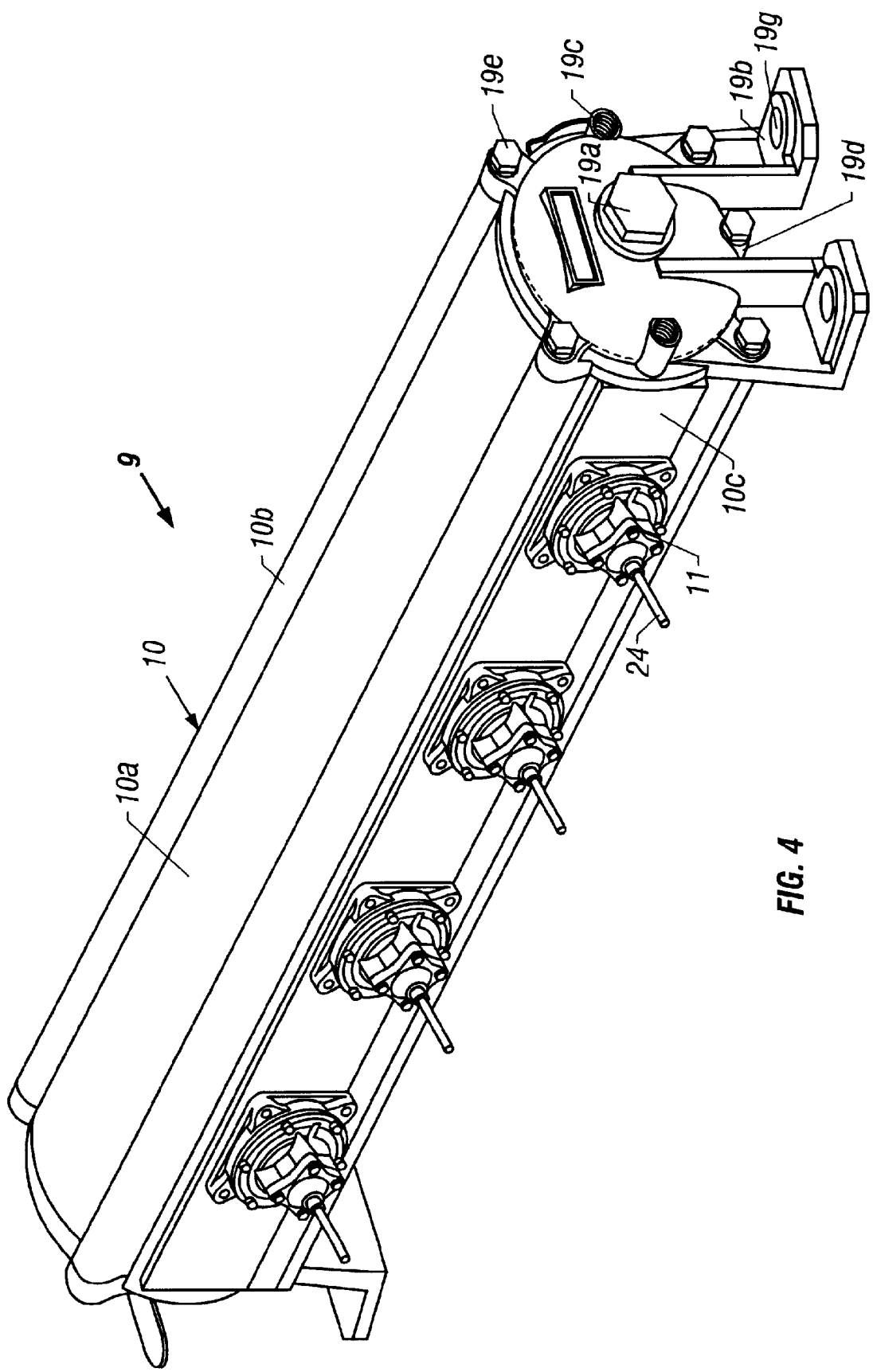
Figure 5:
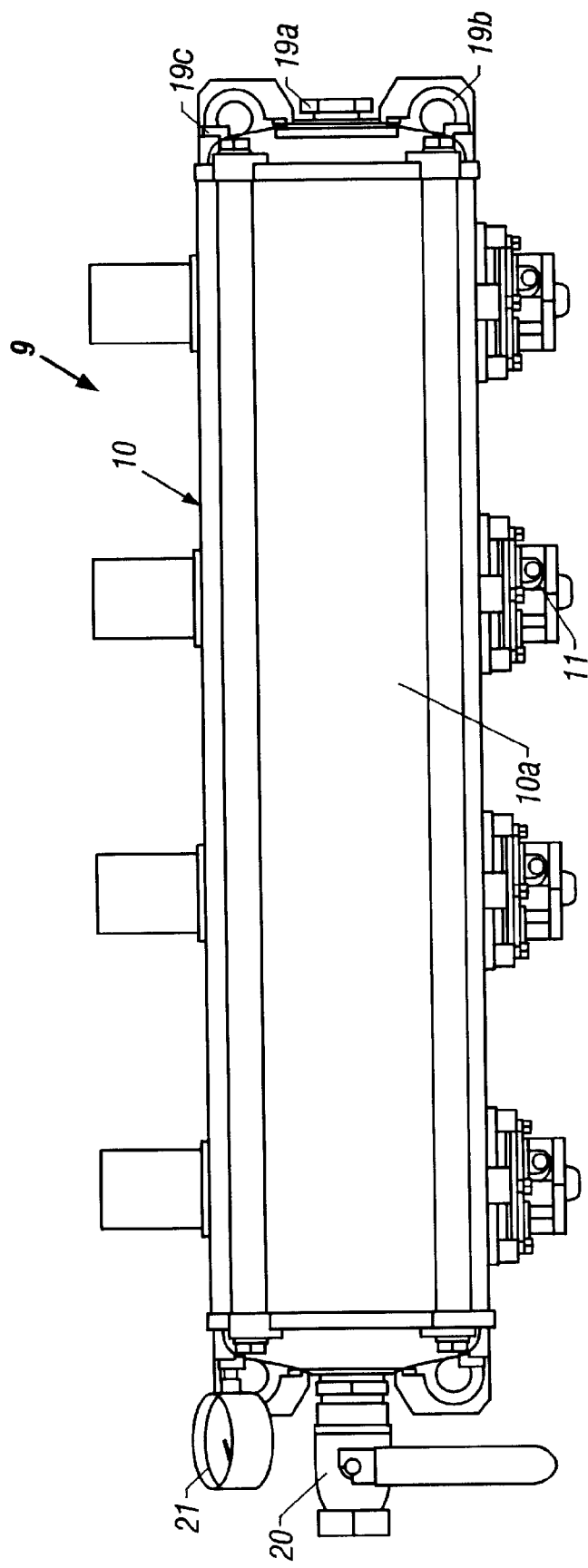
Figure 6:
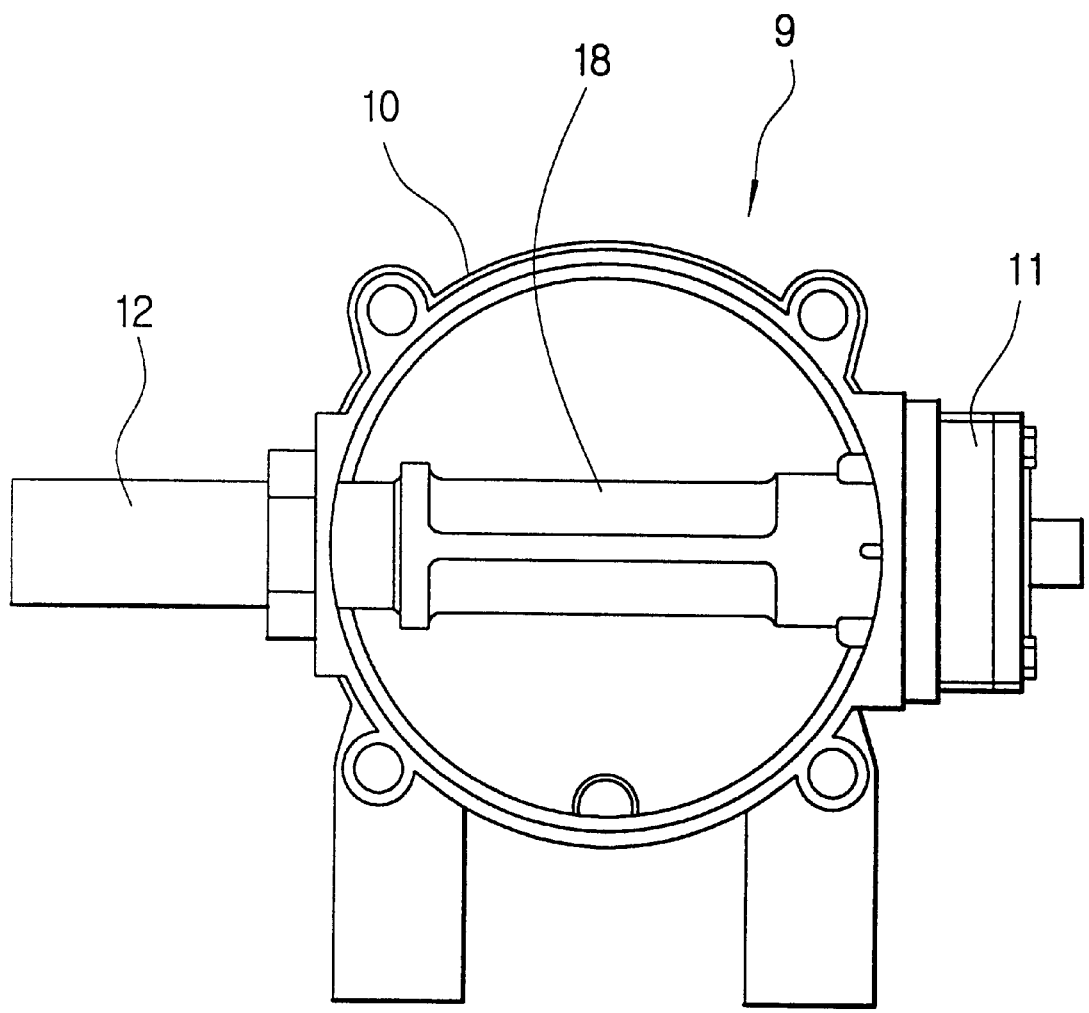
Figure 12:
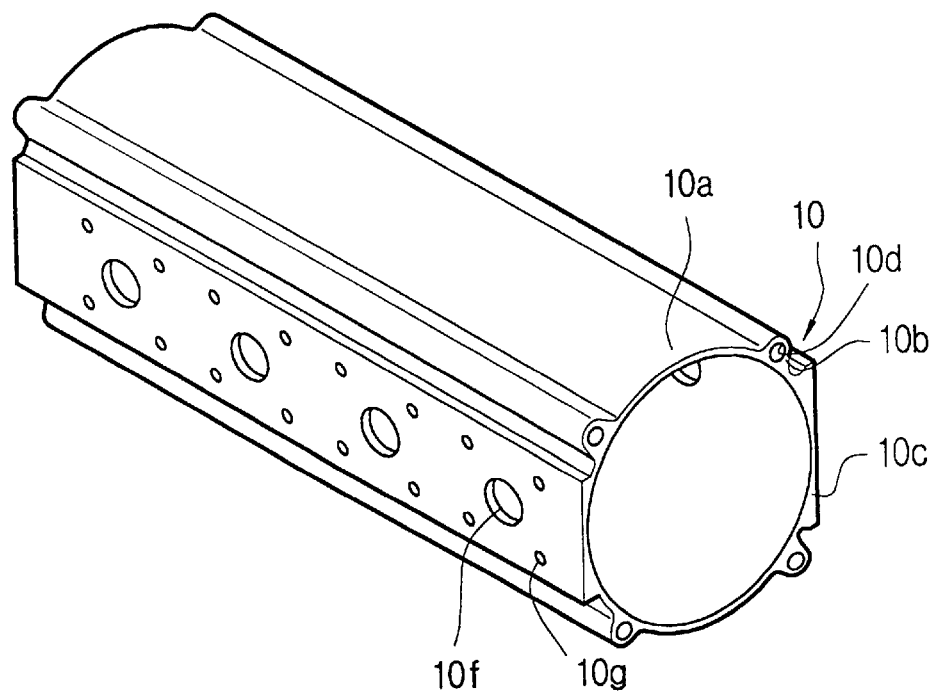
Figure 13:
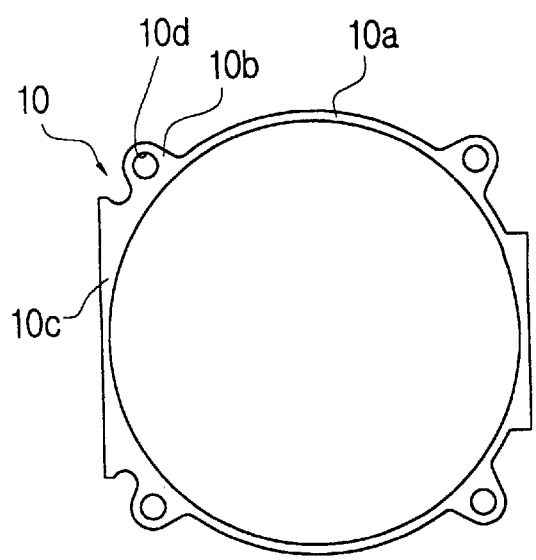

FIG. 4 is a perspective view of the air header. FIG. 5 is a plan view of the air header. FIG. 6 is a sectional view of the air header. FIG. 12 is a perspective view of the header cylinder. FIG. 13 is an end view of the header cylinder. As shown in these drawings, the header cylinder 10 is extrusion-molded by using aluminum, and includes a cylindrical body 10a which includes a plurality of reinforcing projections 10b and a plurality of flat parts 10c integrally and balancedly formed. A drain plug 19d is also provided as shown.

The plurality of the pulse valves 11 are assembled onto the outside of the header cylinder 10, and a distribution tube 18 is assembled within the head cylinder 10 in connection to the pulse valve 11, while the connecting device 12 is connected to the distribution tube 18 and is made to extend to the outside.

A header cover 19 is assembled to each of both ends of the header cylinder 10 by means of a plurality of bolts 19e. The cylindrical body 10a of the header cylinder 10 is provided with a plurality of elongate projections 10b, and a screw hole 10d is formed on each of both ends of the elongate projections 10b. The bolts 19e are fastened into the screw holes 10d when assembling the header covers 19. At the center of the header cover 19, there is formed a hole 19a for introducing a compressed air, and a valve 20 is connected to the hole 19a. A pressure gauge 21 is connected to a connecting device 19c, and a drain valve (not illustrated) is coupled to a lower discharge hole 19d.

Further, the header cover 19 has a plurality of holes along the circumference of it, so that the bolts 19e can be inserted into them. Further, at lower extended portions 19b of the header cover 19, there are formed a pair of holes 19g for receiving bolts when securing the header cover 19 to a fastening member 17.

On a flat part 10c of the header cylinder 10, there are formed a plurality of s connecting holes 10f. Around each of the connecting holes 10f, there are formed a plurality of smaller securing holes 10g. A pulse valve 11 is assembled to each of the connecting holes 10f.

In the drawings, four pulse valves 11 are provided, but the number of the pulse valves 11 may be varied depending on the capacity of the apparatus. The header cylinder 10 is extrusion-molded by using aluminum, and therefore, the extruded tube may be cut into a required length after extrusion-forming a long length.

A control box 50 is secured to a flat portion 10e which is secured to the header cylinder 10. A plurality of solenoid valves 23 are installed on the control box 50, and the solenoid valves 23 are connected through air hoses 24 to the pulse valves 11.

Figure 7A:
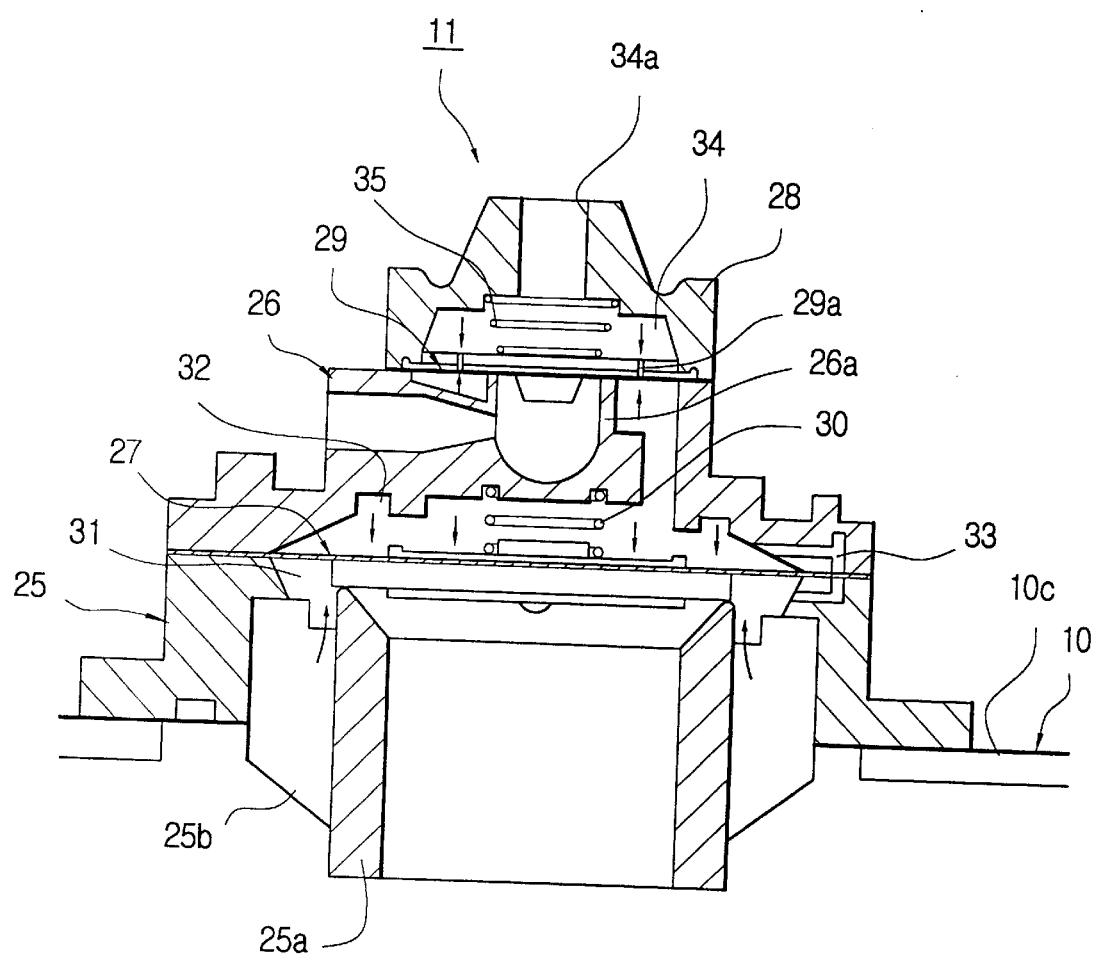
FIGS. 7a and 7b are longitudinal sectional views showing the constitution and action of the pulse valve.
Figure 7B:
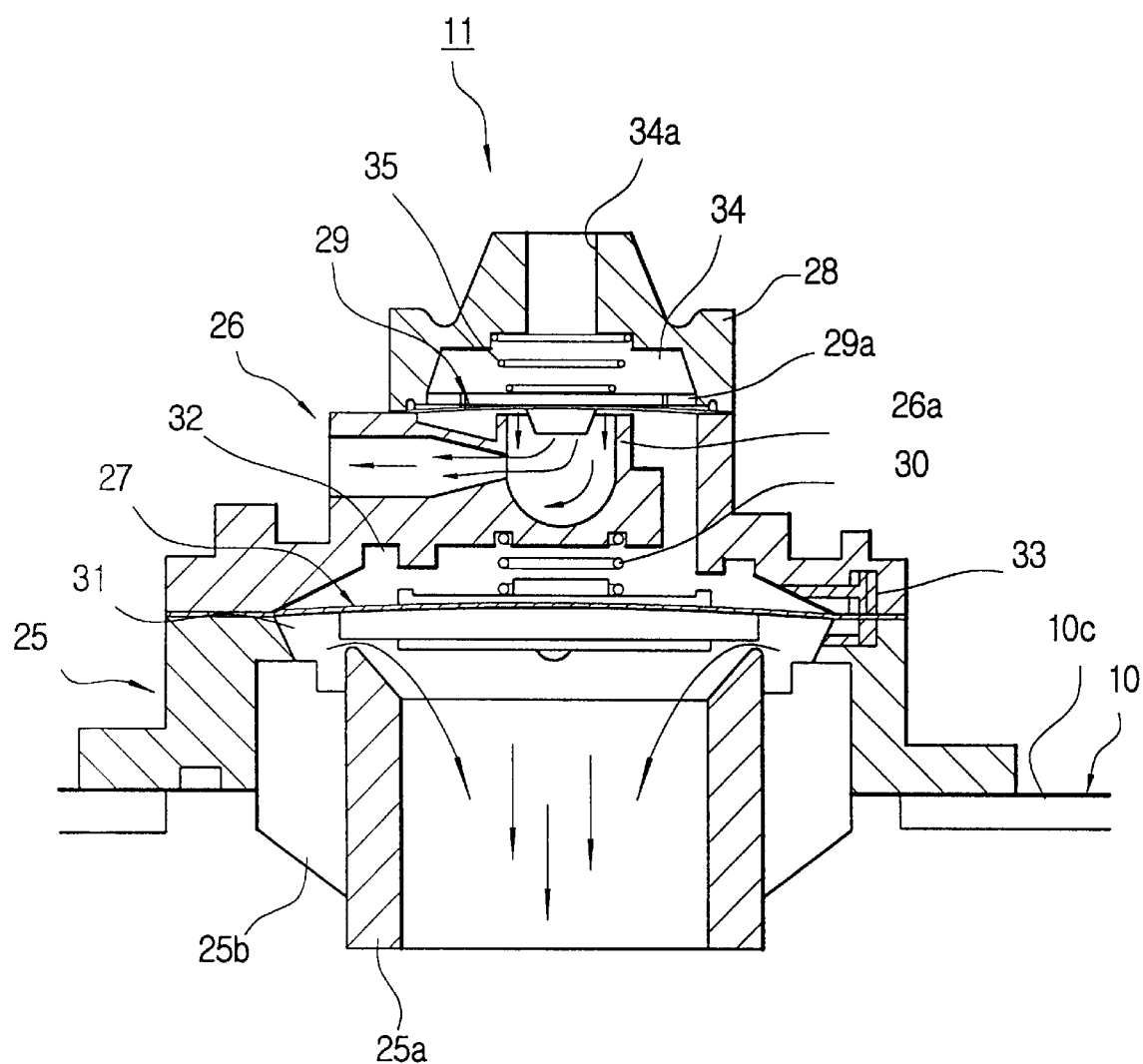
Figure 8:
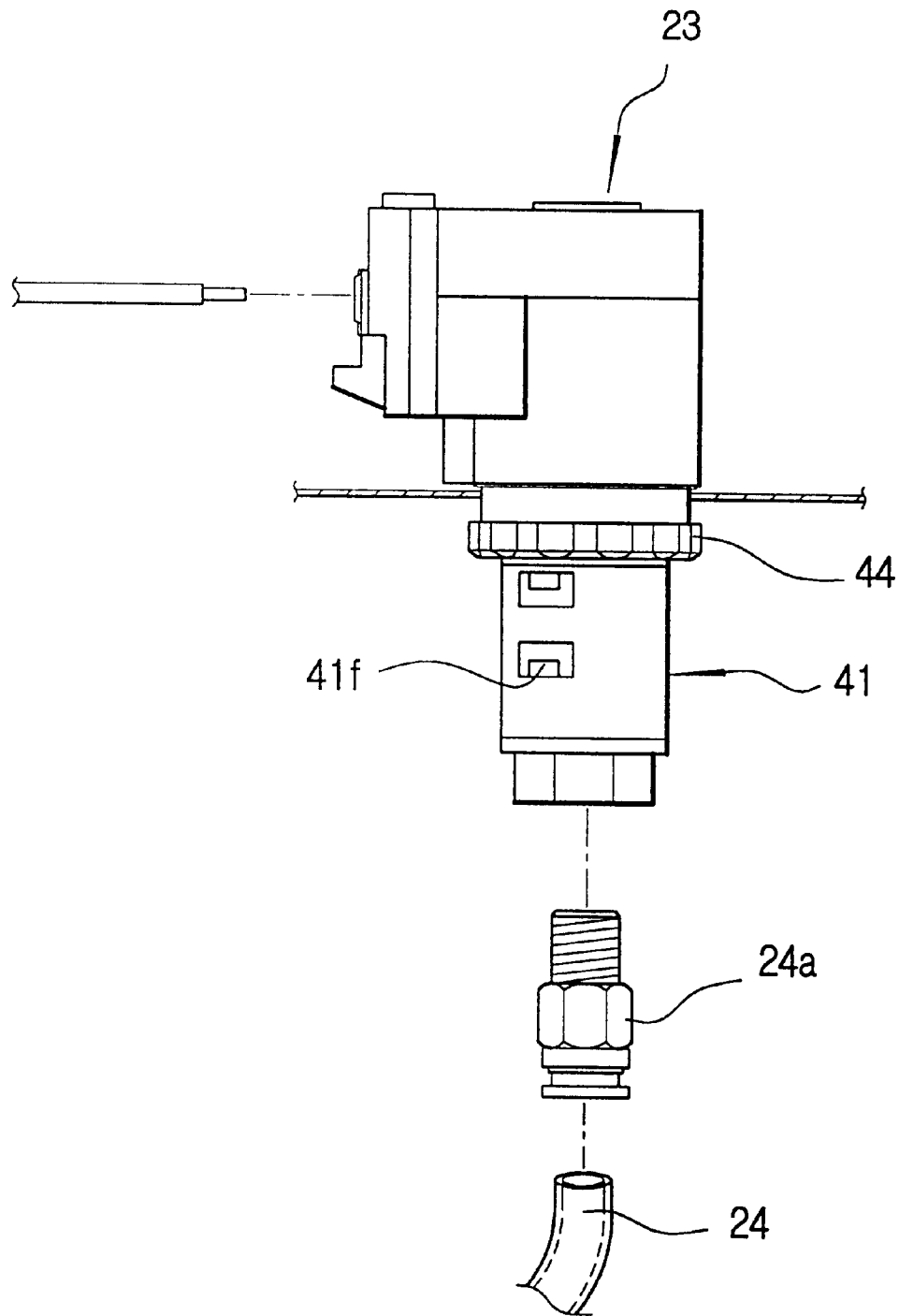

As shown in FIGS. 7a and 7b, the pulse valve 11 includes: an inner body 25 secured to the flat part 10c of the header cylinder 10; an outer body 26 secured to the inner body 25; a first diaphragm 27 secured between the inner and outer bodies 25 and 26; a valve cover 28 secured to the outer body 26; a second diaphragm 29 secured between the outer body 26 and the valve cover 28.

A round discharge part 25a of the inner body 25 is supported by a plurality of ribs 25b, so that the first diaphragm 27 would open/close the hole of the discharge part 25a. A spring 30 is installed on the upper portion of the first diaphragm 27 to press down the first diaphragm 27. Under the first diaphragm 27 and outside the discharge part 25a, there is formed a supply pressure chamber 31. Above the first diaphragm 27, there is formed an intermediate pressure chamber 32. Thus a compressed air can flow through a flow path 33 which communicates into the inner and outer bodies 25 and 26. Under the second diaphragm 29, there is formed a second discharge part 26a in such a manner that the second diaphragm 29 can open/close the hole of the second discharge part 26a. A switching pressure chamber 34 is formed above the second diaphragm 29, and the compressed air can flow through a hole 29a which is formed on the second diaphragm 29. Between the valve cover 28 and the second diaphragm 29, there is installed a conical spring 35 to elastically press down the second diaphragm 29. An air hose 24 is connected to a hole 34a of the valve cover 28.

Figure 11A:
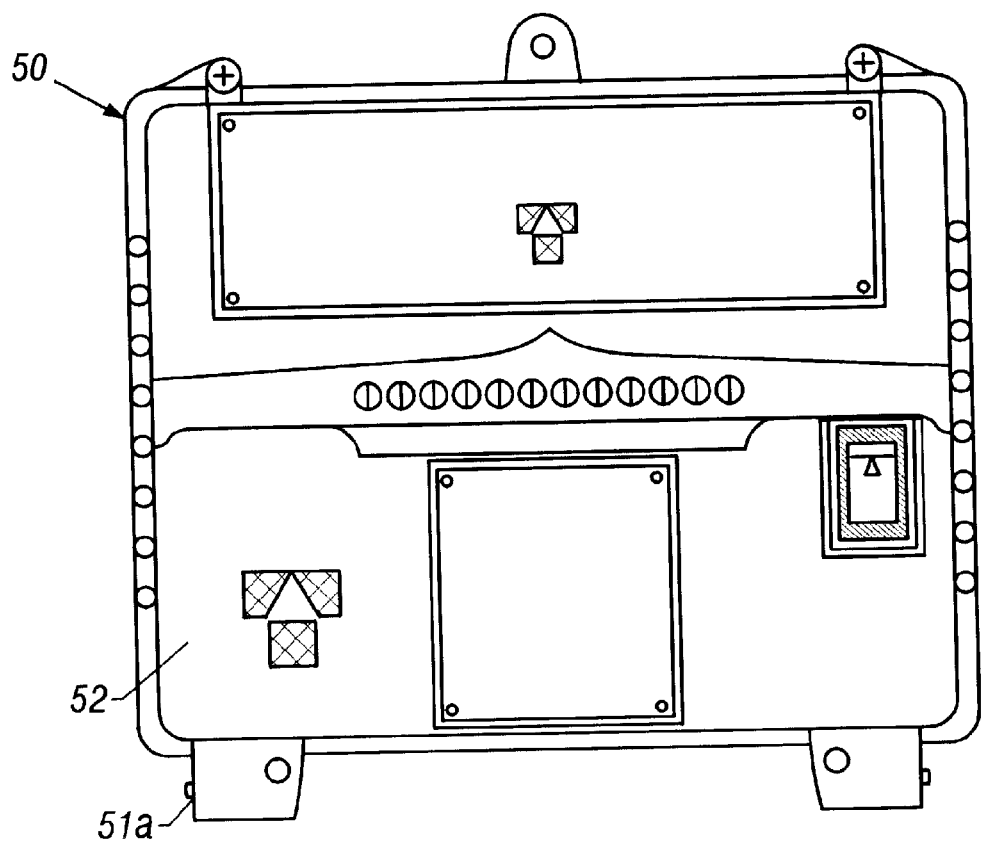
FIGS. 11a, 11b and 11c are frontal, bottom and rear views of the control box.
Figure 11B:
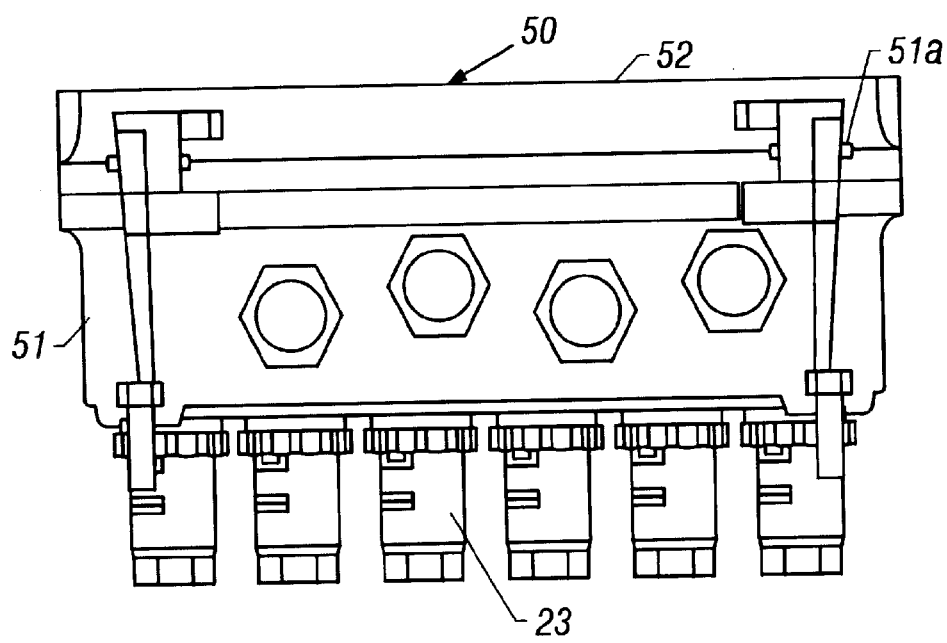
Figure 11C:
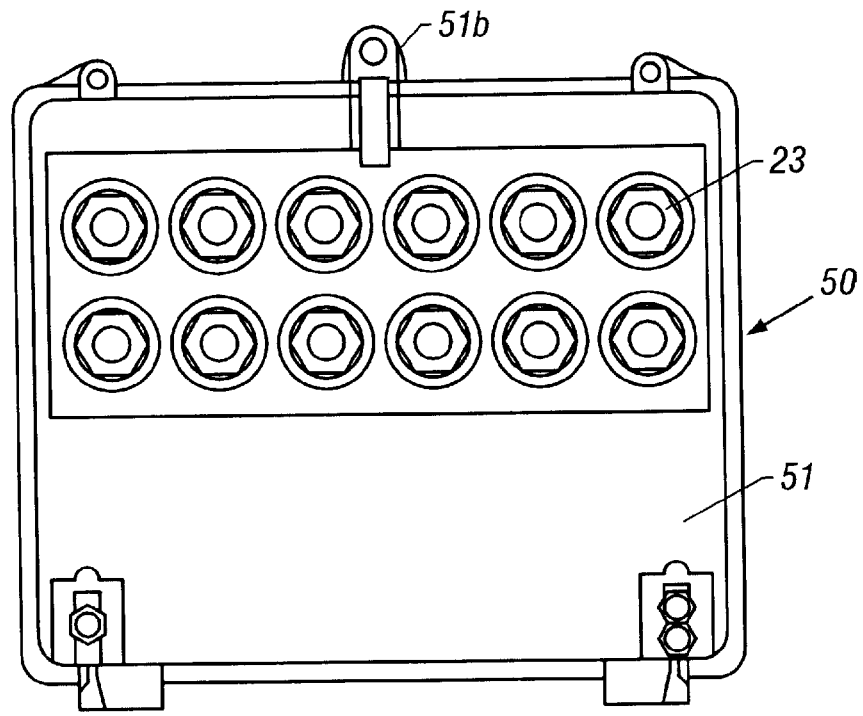
Figure 11D:
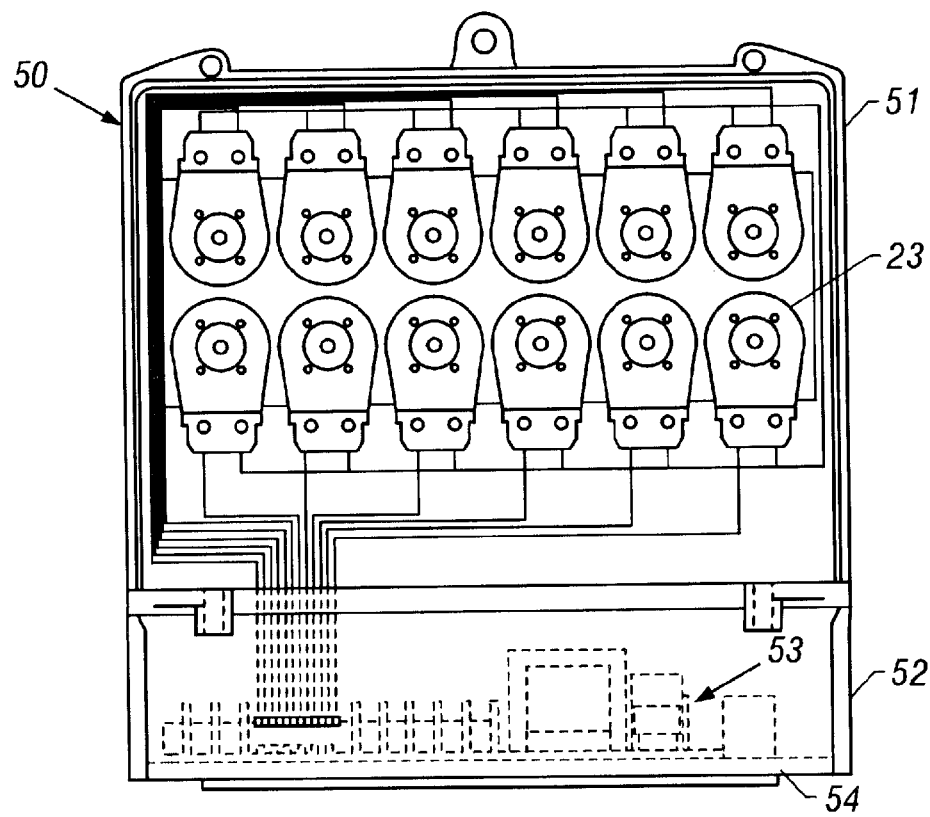
FIG. 11d is a frontal view of the control box completely open.

FIGS. 11a, 11b and 11c are frontal, bottom and rear views of the control box. FIG. 11d is a frontal view of the control box completely open. As shown in these drawings, the control box 50 is secured to a securing plate 36 which is secured to a flat part 10c of the header cylinder 10. A plurality of solenoid valves 23 are installed on the control box 50.

Figure 9:
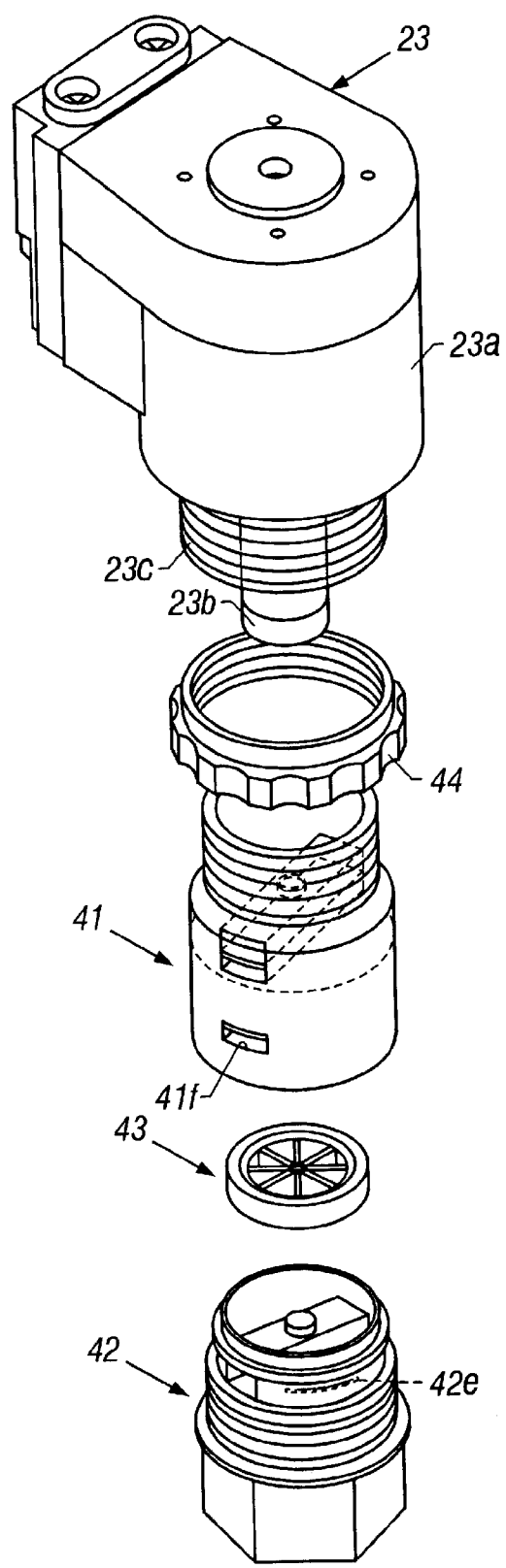

As shown in FIGS. 9 and 10, the solenoid valve 23 is constituted as follows. That is, a first cylinder 41 is fastened to a fastening part 23c of a body 23a, and a second cylinder 42 is fastened to the first cylinder 41. A diaphragm 43 is formed between the first cylinder 41 and the second cylinder 42.

Upon a first gapping plate 41a of the first cylinder 41, there is formed a third discharge part 41b. At the middle of the top of the third discharge part 41b, there is formed a third discharge hole 41c. Inside the third discharge part 41b, there is formed a discharge hole 41d. On the lower portion of the wall of the first cylinder 41, there is formed a discharge hole 41f.

The second cylinder 42 is constituted as follows. That is, on the top of a second gapping plate 42a which is formed on the upper portion of the second cylinder 42, there is formed a fourth discharge part 42b in a form of a rectangular. At the center of the top of the fourth discharge part 42b, there is formed a fourth discharge hole 42c. Within the fourth discharge part 42b, there is formed a fourth discharge mouth 42d. On both sides of the fourth discharge part 42b of the second gapping plate 42a, there are formed communicating holes 42e. Through the lower portion of the second cylinder 42, there is formed a pressure introducing hole 42f. A connecting tube 24 is connected to a connecting hole 24a.

Above the second cylinder 42, there is formed a diaphragm 43 which opens and closes the fourth discharge hole 42c of the second cylinder 42. The diaphragm 43 has a communicating hole 43a, and the first gapping plate 41a also has a communicating hole 41e. Thus the pressure which is introduced into the hole 42f of the second cylinder 42 can be transmitted to an upper pressure chamber 41g of the first cylinder 41.

The first cylinder 41 and a fastening part 23c of the solenoid body 23a are fastened together by means bolts and an O-ring 45 to make them air-tight.

A main body 51 and a cover 52 of the control box 50 are pivotally coupled together by using a hinge part 51a and locking part 51b. Further, there is installed a locking part 51b for locking the cover 52 to the main body 51. A plurality of the solenoid valves 23 are installed on the main body 51, while a printed circuit board 54 having a control part 53 is secured on the cover 52.

The solenoid valves 23 are secured in the following manner. That is, a fastening part 23c is inserted to a fastening hole 51c of the bottom of the main body 51, and a fastening ring 44 is fastened to the fastening part 23c.

A connecting tube 24 is connected to the introducing hole 42f of the solenoid valve 23, while the other end of the connecting tube 24 is connected to a discharge hole 34a of the pulse valve 11.

The header cylinder, the pulse valves 11 and various other pipes are extrusion molded by using aluminum. On them, an anodizing treatment is carried out to prevent the formation of rusts, thereby preventing malfunctions of the valves. Further, a precise machining is carried out to strictly meet the tolerances.

In the above described compressed air injecting apparatus, as shown in FIG. 7a, a compressed air is supplied from an air compressor (not illustrated) into the header cylinder 10. The compressed air flows from the header cylinder 10 through the pilot flow path 33 to the intermediate pressure chamber 32. The first diaphragm 27 which is disposed between the inner and outer bodies 25 and 26 closely contacts to the top of the discharge part 25a of the inner body 25 owing to the elastic force of the spring 30 and owing to the pressure of the intermediate pressure chamber 32. Thus the compressed air of the header cylinder 10 is prevented from flowing into the discharge part 25a.

Further, the pressure of the intermediate pressure chamber 32 is transmitted through the communicating hole 29a of the second diaphragm 29 into the switching pressure chamber 34. Further, the second diaphragm 29 which is disposed between the outer body 26 and the valve cover 28 closely contacts to the top of the discharge part 26a owing to the elastic force of the spring 35 and owing to the pressure of the switching pressure chamber 34. Thus the compressed air of the intermediate pressure chamber 32 is prevented from flowing into the discharge part 26a.

Figure 10A:
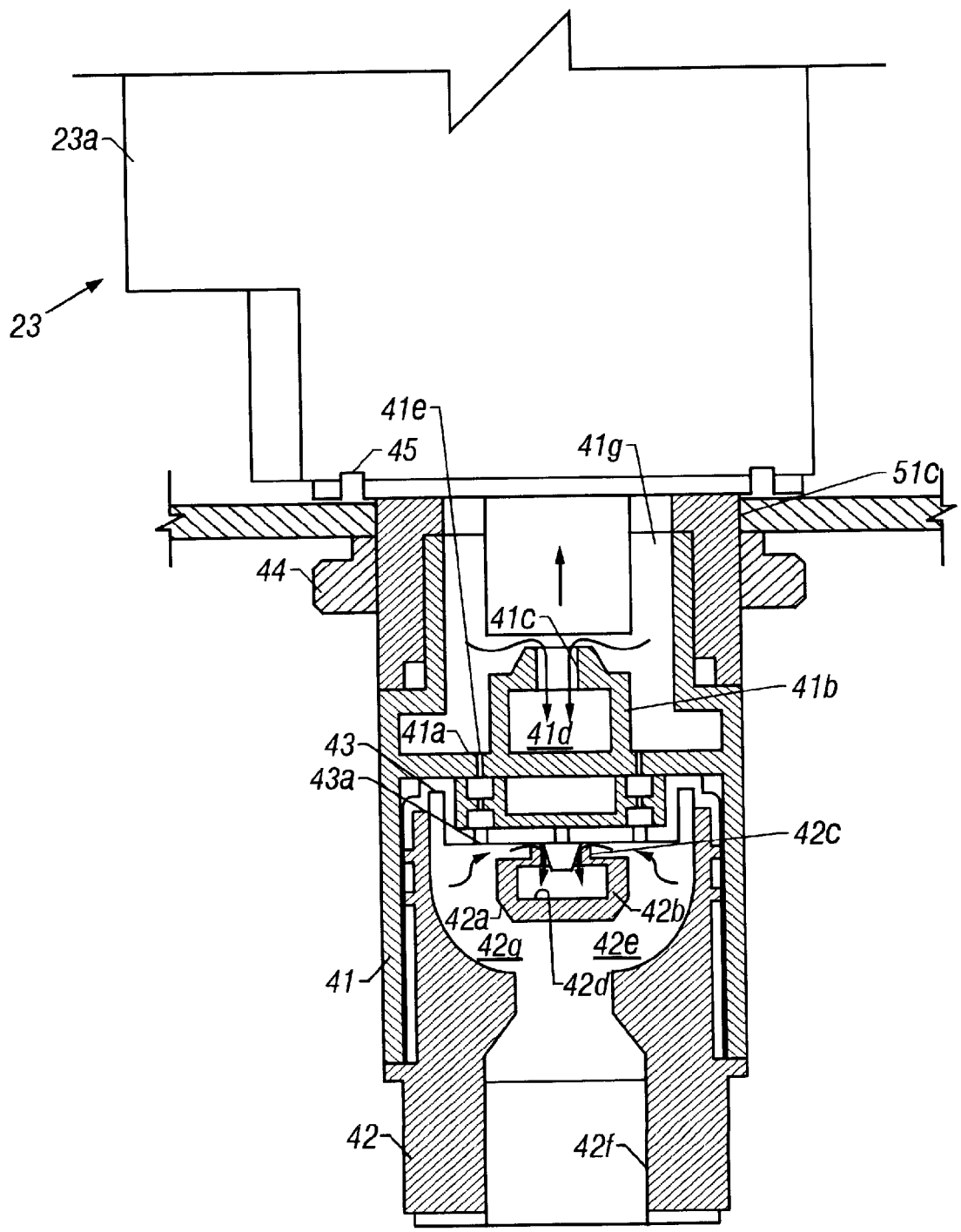
FIGS. 10a and 10b are longitudinal sectional views showing the constitution and action of the solenoid valve.

Further, as shown in FIG. 10a, the pressure of the switching pressure chamber 34 of the pulse valve 11 is transmitted through the connecting tube 24 into the introducing hole 42f of the solenoid valve 23. Consequently, the lower pressure chamber 42g of the second cylinder 42 is activated, and thus, the pressure of the lower pressure chamber 42g is transmitted through the communicating hole 43a of the diaphragm 43 and through the communicating hole 41e of the first gapping plate 41a of the first cylinder 41 into the upper pressure chamber 41g. Under this condition, an activator 23b of the solenoid valve 23 closes the third discharge hole 41c of the third discharge part 41b. Therefore, the compressed air cannot be discharged through the third discharge hole 41d. Further, the diaphragm 43 closes the fourth discharge hole 42c of the fourth discharge part 42b, and therefore, the compressed air cannot be discharged through the fourth discharge hole 42d.

Thus, if the solenoid valves 23 and the pulse valves 11 are closed, the compressed air of the header cylinder 10 cannot be discharged through the air injecting pipes 13 which are connected to the pulse valves 11.

Figure 10B:
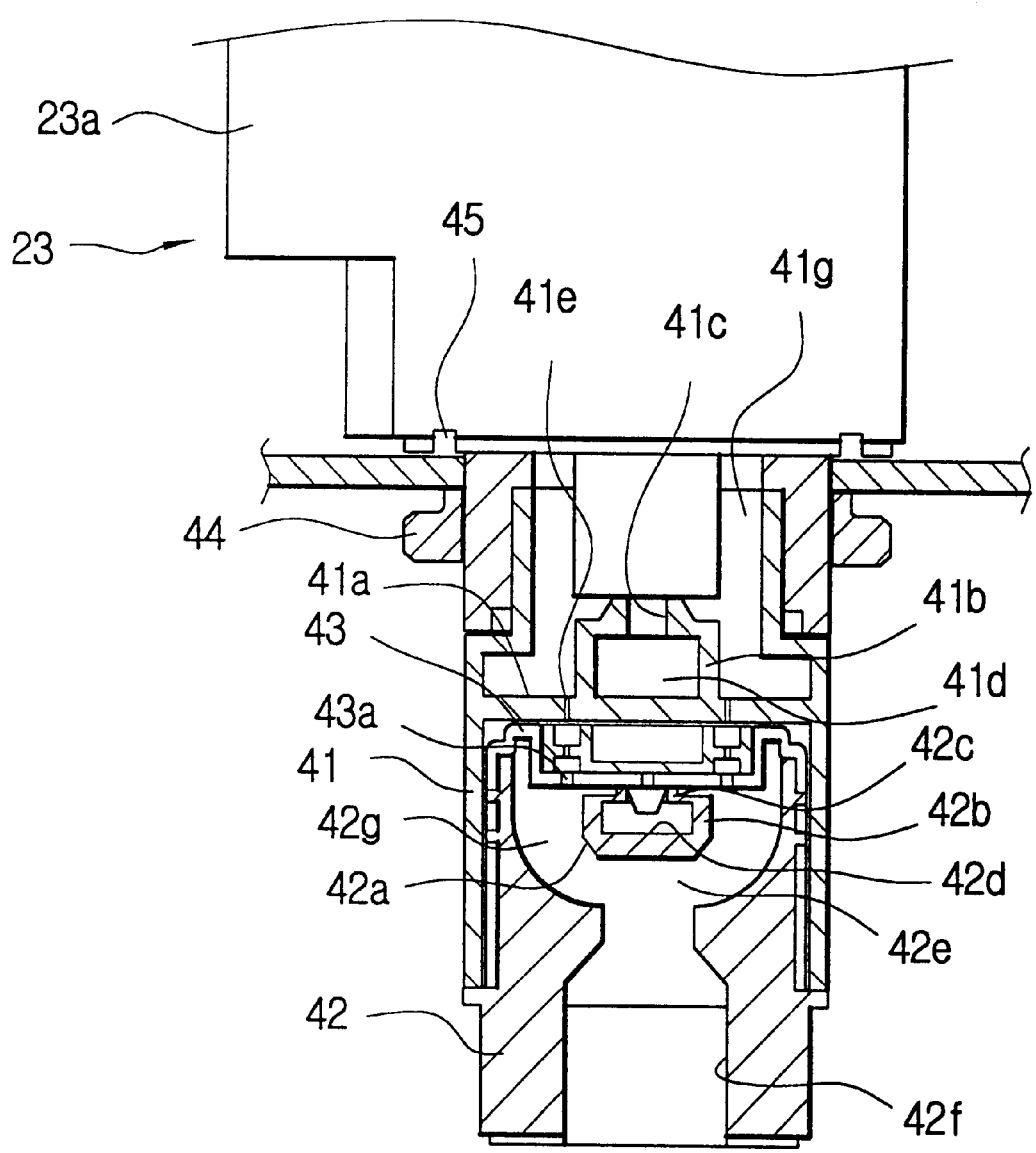

However, if the power is supplied to the solenoid valves 23 owing to signals of a timer circuit of the control box 50, and thus, if the activator 23b is pulled into the body 23a of the solenoid valve, then as shown in FIG. 10b, the third discharge hole 41c of the third discharge part 41b is opened. Thus the compressed air of the upper pressure chamber 41g flows sideward through the third discharge hole 41d. Further, owing to the discharge of the pressure from above the diaphragm 43, the diaphragm 43 is separated from the fourth discharge hole 42c of the fourth discharge part 42b, and therefore, the compressed air of the lower pressure chamber 42g is discharged through the fourth discharge hole 42d.

Thus if the compressed air is discharged from the solenoid valves 23, then as shown in FIG. 7b, the pressure of the switching pressure chambers 34 of the pulse valves 11 drops. Consequently, the second diaphragm 29 is pushed backward to be separated from the discharge part 25a, with the result that the compressed air of the intermediate pressure chamber 32 is discharged through the discharge part 26a. Further, as the pressure of the intermediate pressure chamber 32 drops, the first diaphragm 27 is pushed back to be opened. Therefore, the compressed air of the header cylinder 10 is supplied into the plurality of the air injecting pipes 13, and thus, the compressed air is supplied through the nozzles 15 of the air injecting pipes 13 into the filtering cloth sacks 3.

In this manner, the compressed air which is spouted downward (in a direction opposite to the filtering direction) enters into the filtering cloth sacks 3 through the venturi tubes 5. Owing to the strong injecting of the compressed air, the dust particles adhered on the outside of the filtering cloths 3 are detached off, while the filtering cloth sacks 3 are vibrating.

Thus, under the control of the control box 50, the plurality of the solenoid valves 23 are opened or closed, and at the same time, the pulse valves 11 are opened or closed. In this manner, the compressed air is periodically spouted into the filtering cloth sacks 3, so that the dust particles adhered on the outside of the filtering cloths would be detached off. The control box 50 periodically activates the solenoid valves and the pulse valves.

According to the present invention as described above, precise pitches and straightness are maintained, and therefore, there is no difficulty in meeting the tolerances. Further, the shipping is made after completing the wiring, and therefore, only the bolts have to be tightened when the installing the apparatus.

Further, during the manufacture of the dust collector, the procurement of steel pipes, the cutting of them and welding of them are not required unlike in the conventional method, and therefore, the labor cost can be saved, as well as shortening the manufacturing period.

Further, the pulse valves are buried into the header cylinder, and therefore, the pressure loss is minimized. Further, the pipes have no bent portions, and therefore, the pressure loss in these portions is eliminated. The cross sectional areas of the introducing holes of the valves are designed to be large, and therefore, the flow amount is maximized. Therefore, compared with other valves having the same size, the dust detaching efficiency is superior.

Further, the header cylinder is subjected to an anodizing surface treatment, and the accumulated water on the header cover is periodically drained by the draining valve. Therefore, any internal corroding does not occur. The valves are buried into the header cylinder, but the diaphragms and the springs are exposed to the outside, and therefore, the replacements of components are easy.

Further, the solenoid valves and the timer are installed on the same box, and therefore, the expense can be save as well as shortening the manufacturing period.

What is claimed is:

1. An apparatus for injecting a compressed air into a dust collector in a direction opposite to a filtering direction so as to detach adhered dust particles, comprising:

a dust collecting tank with a plurality of filtering cloths and a plurality of air injecting pipes installed therein;

an air header secured to an outside of said dust collecting tank by means of fastening members;

the plurality of said air injecting pipes connected through connecting devices to a circumferential wall of a head cylinder of said air header;

a plurality of pulse valves directly secured to another part of the circumferential wall of said header cylinder, for closing/opening a supply of a compressed air;

a plurality of distribution tubes secured between said pulse valves and said connecting devices;

a control box accommodating a printed circuit board of a control part; and a plurality of solenoid valves installed on said control box so as to be connected between said pulse valves and connecting tubes, for periodically actuating said pulse valves.

2. The apparatus as claimed in claim 1, wherein said header cylinder is extrusion-molded by using aluminum, and said cylindrical body of said header cylinder includes a plurality of integrally formed reinforcing projections and flat parts, header covers being secured to both ends of said header cylinder.

3. The apparatus as claimed in claim 1, wherein said pulse valve comprises:

an inner body secured on said flat part of said header cylinder, with a round discharge part being supported by a plurality of ribs and provided at an intermediate part, and with a supply pressure chamber being provided therein;

an outer body secured to said inner body, and having a discharge part and an intermediate pressure chamber, said inner and outer bodies having a pilot flow path;

a first diaphragm secured between said inner and outer bodies, for opening/closing a hole of said discharge part;

a spring installed at an upper intermediate portion of said first diaphragm, for elastically pressing down said first diaphragm;

a valve cover secured to said outer body, and having a switching pressure chamber and an outlet hole connected to said connecting tube;

a second diaphragm secured between said outer body and said valve cover, for opening/closing said discharge part, and having a communicating hole on a side thereof; and a conical spring coupled between said valve cover and said second diaphragm, for elastically supporting said second diaphragm.

4. The apparatus as claimed in claim 1, wherein said control box comprises:

a main body and a cover coupled together through a hinge;

a lock part for locking said cover to said main body;

the plurality of solenoid valves secured therein; and a printed circuit board having a control function installed on said cover.

* * * * *